United States Patent
Qi et al.

(10) Patent No.: US 12,515,785 B2
(45) Date of Patent: Jan. 6, 2026

(54) WING AND METHOD FOR IMPROVING CONTROL EFFICIENCY OF TWO-DIMENSIONAL AIRFOIL RUDDER SURFACE

(71) Applicant: NINGBO INSTITUTE OF TECHNOLOGY, BEIHANG UNIVERSITY, Zhejiang (CN)

(72) Inventors: Zhongyang Qi, Zhejiang (CN); Siyu Zong, Zhejiang (CN); Yankui Wang, Zhejiang (CN); Chong Pan, Zhejiang (CN)

(73) Assignee: NINGBO INSTITUTE OF TECHNOLOGY, BEIHANG UNIVERSITY, Ningbo (CN)

( * ) Notice: Subject to any disclaimer, the term of this patent is extended or adjusted under 35 U.S.C. 154(b) by 0 days.

(21) Appl. No.: 18/661,514

(22) Filed: May 10, 2024

(65) Prior Publication Data
US 2024/0294245 A1 Sep. 5, 2024

Related U.S. Application Data

(63) Continuation of application No. PCT/CN2022/111858, filed on Aug. 11, 2022.

(30) Foreign Application Priority Data

Dec. 15, 2021 (CN) .......................... 202111561437.9

(51) Int. Cl.
*B64F 5/60* (2017.01)
*B64C 9/08* (2006.01)

(52) U.S. Cl.
CPC . *B64C 9/08* (2013.01); *B64F 5/60* (2017.01)

(58) Field of Classification Search
CPC ................ B64C 9/00; B64C 9/08; B64F 5/60
See application file for complete search history.

(56) References Cited

U.S. PATENT DOCUMENTS 3,921,942 A * 11/1975 Bracka .................. B64C 21/025
244/87
4,230,295 A * 10/1980 Eppler ..................... B64C 9/16
16/370

(Continued)

FOREIGN PATENT DOCUMENTS

| CN | 106800086 A | 6/2017 |
| CN | 109703743 A | 5/2019 |

OTHER PUBLICATIONS

Gap influence on rudder efficiency of flying wing aircraft; YAO Junkai etc. "Acta Aerodynamica Sinica" vol. 35 , No. 6; Dec. 2017; pp. 850-854.

*Primary Examiner* — Eric S. McCall

(57) ABSTRACT

Disclosed are a wing and a method for improving a control efficiency of a two-dimensional (2D) airfoil rudder surface. A technical solution is realized by changing an original symmetric airfoil rudder surface into an asymmetric airfoil rudder surface, mounting the asymmetric airfoil rudder surface and a main wing in a misaligned manner to form a gap, and utilizing a gap effect to interfere with a flow on an upper wing surface of the rudder surface, allowing the rudder surface to generate a larger moment, thereby improving a control efficiency of a 2D airfoil rudder surface. According to the present disclosure, a rudder surface control efficiency is greatly improved by simple structural optimization; a pilot is easy to perform operations in a control process; and a control device can utilize an airplane's own components, without introducing large power energy and other driving equipment, no additional load on the airplane.

4 Claims, 4 Drawing Sheets

(56) References Cited

U.S. PATENT DOCUMENTS

| | | | |
|---|---|---|---|
| 12,377,963 B2* | 8/2025 | Camlica | B64C 13/50 |
| 2004/0094659 A1 | 5/2004 | Finnegan et al. | |
| 2017/0274977 A1* | 9/2017 | Zhang | B64C 9/00 |
| 2020/0378499 A1* | 12/2020 | Dovey | B64C 9/02 |

* cited by examiner

WING AND METHOD FOR IMPROVING CONTROL EFFICIENCY OF TWO-DIMENSIONAL AIRFOIL RUDDER SURFACE

CROSS-REFERENCE TO RELATED APPLICATIONS

This application is a continuation of PCT/CN2022/111858, filed Aug. 11, 2022 and claims priority of Chinese Patent Application No. 202111561437.9, filed on Dec. 15, 2021, the entire contents of which are incorporated herein by reference.

TECHNICAL FIELD

The present disclosure relates to the technical field of wing rudder surfaces, and specifically to a method for improving a control efficiency of a two-dimensional (2D) airfoil rudder surface, and a corresponding wing structure.

BACKGROUND

With the continuous improvement of the maneuvering performance of a contemporary aircraft, a modern airplane has increasingly high performance requirements for airplane maneuverability. An aerodynamic maneuvering moment, as an important parameter to complete airplane maneuvering, makes a rudder surface efficiency of an aerodynamic maneuvering surface of an airplane play a key role in the whole airplane flight process, especially for an airplane with a blended wing body layout that lacks a tail structure, a rudder surface is often required to have a greater aerodynamic maneuvering efficiency. However, the aerodynamic maneuvering efficiency is seriously affected by a rudder deflection angle, and a control efficiency of the rudder surface decreases dramatically with the increase of the rudder deflection angle. Therefore, how to improve an efficiency of flight control is an urgent problem for modern airplanes. Improving the rudder surface efficiency by improving a flow on the rudder surface is an important means to effectively enhance the maneuvering performance of the airplane.

The current rudder surface efficiency improvement solutions mainly focus on adding disturbing sheets or blowing devices to a leading edge of a rudder surface, thus changing the flow characteristics of an upper wing surface of the rudder surface to improve the aerodynamic characteristics of the rudder surface. Due to the additional load on airplane caused by the introduction of other devices, it is necessary to develop a novel rudder surface efficiency improvement technique. Currently, in domestic and foreign studies, there is no method to improve a rudder surface efficiency of a 2D airfoil rudder surface by misaligning the rudder surface with a main wing to form a gap.

SUMMARY

An objective of the present disclosure is to provide a wing and a method for improving a control efficiency of a 2D airfoil rudder surface to solve the problems existing in the related art.

An inventive concept of the present disclosure is that by changing an original symmetric airfoil rudder surface into an asymmetric airfoil rudder surface, a pitching moment coefficient of the asymmetric airfoil rudder surface is larger, which can provide a larger rudder surface control efficiency; and by mounting the asymmetric airfoil rudder surface and a main wing in a misaligned manner to form a gap, a gap effect is utilized to interfere with a flow on an upper wing surface of the rudder surface, i.e., the gap between a lower wing surface of the main wing and the rudder surface is utilized to control a separated flow on the rudder surface, so that the rudder surface generates an increased moment and the control efficiency of the 2D airfoil rudder surface is improved.

The present disclosure provides the following technical solutions.

A wing includes a main wing and a rudder surface, the rudder surface having a shape of an asymmetric airfoil, and the rudder surface being translatable downward and in a leading edge direction of the main wing, forming a gap between a lower wing surface of the main wing and the rudder surface.

A method for improving a control efficiency of a 2D airfoil rudder surface includes the following steps:
  step 1: determining a rudder surface efficiency of an original symmetric airfoil rudder surface;
  step 2: replacing the original symmetric airfoil rudder surface with an asymmetric airfoil rudder surface of equal or greater rudder surface efficiency;
  step 3: translating the asymmetric airfoil rudder surface downward and in a leading edge direction of a main wing, allowing the same to be misaligned with the main wing to generate a misalignment gap, and determining a rudder surface efficiency at a current misalignment position;
  step 4: repeating step 3 to determine a misalignment position with an optimal rudder surface efficiency; and
  step 5: changing, in a case that a rudder control efficiency fails to meet control requirements, a position of the rudder surface relative to the main wing, allowing the rudder surface to be translated to the misalignment position with an optimal rudder surface efficiency.

Compared with the prior art, the present disclosure has at least the following beneficial effects.

The rudder surface control efficiency is greatly improved by simple structural optimization. A pilot is easy to perform operations in a control process. A control device can utilize an airplane's own components, without introducing large power energy and other driving equipment, no additional load on the airplane.

DETAILED DESCRIPTION

In the present disclosure, by means of a gap between a main wing and an asymmetric airfoil rudder surface, an airflow flowing on an upper wing surface of a rudder surface is controlled to change a separated flow of the rudder surface into an attached flow, increasing a rudder surface control efficiency of an airplane.

The present disclosure is further described by reference to the accompanying drawings and examples below.

A method for improving a control efficiency of a 2D airfoil rudder surface includes the following steps.

In step 1, a rudder surface efficiency of an original symmetric airfoil rudder surface is determined.

Figure 1:
FIG. 1 is a schematic diagram of an original airfoil rudder surface according to the present disclosure.

The original symmetric airfoil rudder surface is shown in FIG. 1. This rudder surface is incapable of providing a sufficient maneuvering moment when flying at a large rudder deflection angle is performed.

Figure 4:
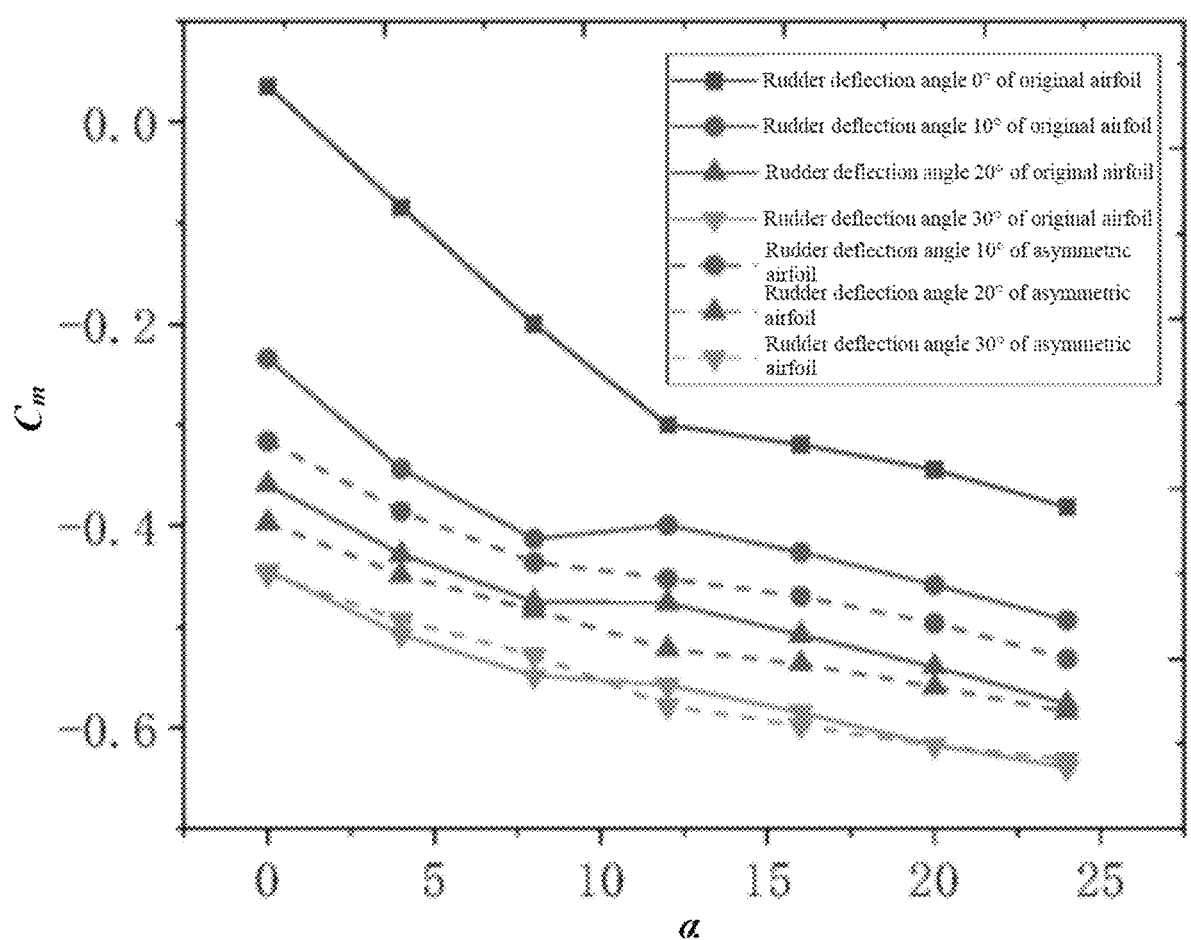
FIG. 4 shows curves of pitching moment characteristics changing with angles of attack at different rudder deflection angles for the original airfoil rudder surface and the asymmetric airfoil rudder surface according to the present disclosure.

In this step, pitching moments of the original symmetric airfoil rudder surface at different rudder deflection angles are investigated by wind tunnel experiments and/or numerical simulations, and relationships of the pitching moments of the original symmetric airfoil rudder surface changing with angles of attack at various rudder deflection angles are obtained. Typical rudder deflection angles are selected as preferred. In this example, the curves of pitching moments changing with angles of attack at different rudder deflection angles, for instance, at 10°, 20°, and 30°, are shown in FIG. 4.

In step 2, a shape of a rudder surface is changed, and the original symmetric airfoil rudder surface is replaced with an asymmetric airfoil rudder surface of equal or greater rudder surface efficiency.

Figure 2:
FIG. 2 is a schematic diagram after changing a rudder surface into an asymmetric rudder surface according to the present disclosure.

The shape of the original symmetric airfoil rudder surface is changed into an asymmetric airfoil. The typical rudder deflection angles in step 1 are selected for wind tunnel experiments and/or numerical simulation studies to obtain the curves of pitching moments changing with angles of attack at different rudder deflection angles after shape-changing is performed. By experiments, the asymmetric airfoil rudder surface of equal or greater rudder surface efficiency is obtained, with which the original symmetric airfoil rudder surface is replaced. The changed asymmetric airfoil rudder surface is schematically represented in FIG. 2. A control efficiency of the asymmetric airfoil rudder surface in this example is shown in FIG. 4.

In step 3, the asymmetric airfoil rudder surface is translated downward and in a leading edge direction of a main wing, allowing the same to be misaligned with the main wing to generate a misalignment gap, and a rudder surface efficiency at a current misalignment position is determined.

Figure 3:
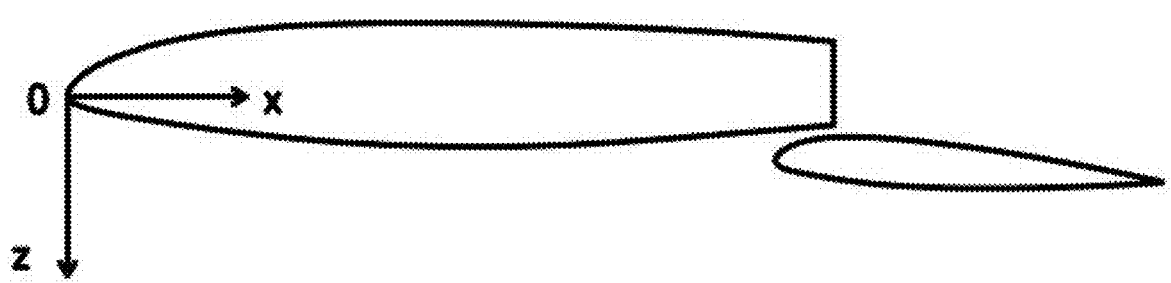
FIG. 3 is a schematic diagram of a misaligned asymmetric rudder surface according to the present disclosure.

A position of the asymmetric airfoil rudder surface relative to the main wing is changed, and a misaligned asymmetric rudder surface formed by changing position is schematically represented in FIG. 3.

By means of wind tunnel experiments and/or numerical simulation studies, for the typical rudder deflection angles in step 1, the curves of pitching moments changing with angles of attack of the misaligned asymmetric rudder surface at different rudder deviation angles are obtained.

In step 4, step 3 is repeated to determine a misalignment position with an optimal rudder surface efficiency.

Figure 5:
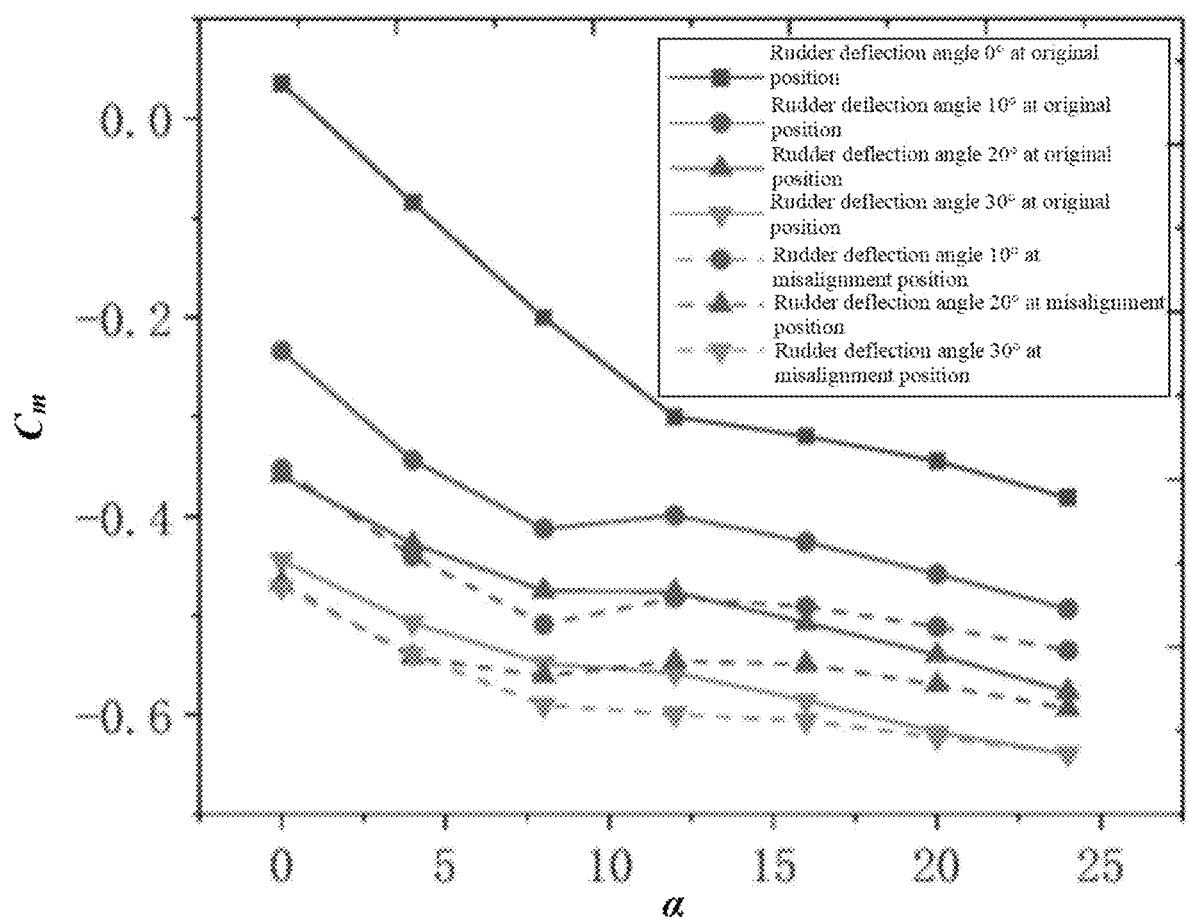
FIG. 5 shows curves of pitching moment characteristics changing with angles of attack at different rudder deflection angles for the original airfoil rudder surface and the misaligned asymmetric rudder surface according to the present disclosure.

In this example, the asymmetric airfoil rudder surface is translated in a negative direction of an x-axis and in a positive direction of a z-axis. Both distances of the translation in the negative direction of the x-axis and in the positive direction of the z-axis are selected to be 4% of a chord length of an airfoil. A control efficiency of the misaligned asymmetric rudder surface and a control efficiency of the original symmetric airfoil rudder surface in this example are shown in FIG. 5.

In step 5, in a case that a rudder surface control efficiency fails to meet control requirements, a position of the rudder surface relative to the main wing is changed, allowing the rudder surface to be translated to the misalignment position with an optimal rudder surface efficiency.

Figure 6:
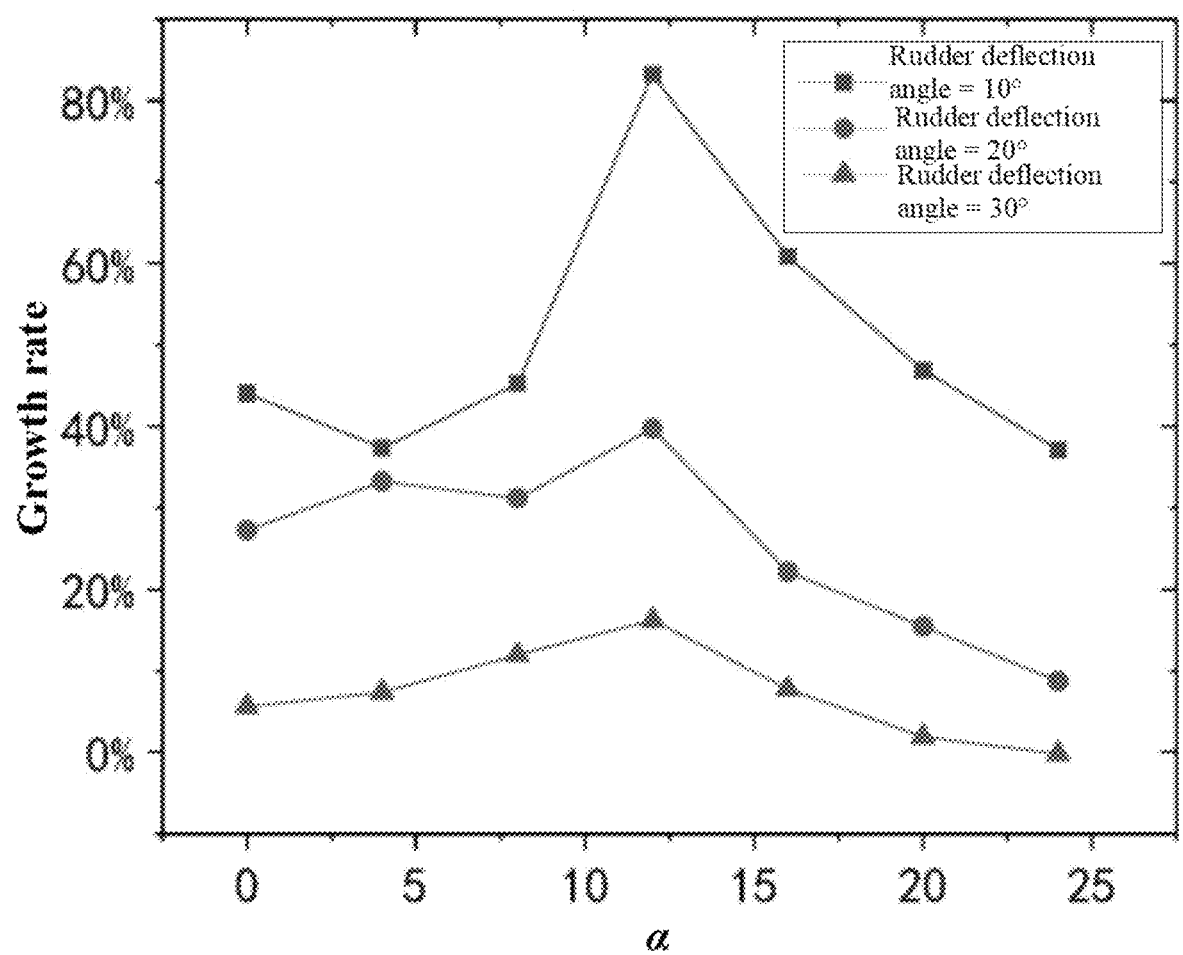
FIG. 6 shows curves of growth in a rudder surface efficiency of the misaligned asymmetric rudder surface over that of the original symmetric rudder surface according to the present disclosure.

The improvement effect of the rudder surface control efficiency according to method in this example is shown in FIG. 6. It can be seen that pitching moment coefficients increase significantly at all rudder deflection angles, with a maximum increase of 80%, and the rudder surface control efficiency is significantly improved.

The present disclosure is described in detail by means of specific examples. These detailed descriptions are only limited to helping a person skilled in the art to understand the content of the present disclosure, and are not to be construed as a limitation of the scope of protection of the present disclosure. Various embellishments, equivalent transformations, etc. made by the person skilled in the art under the concept of the present disclosure shall be included in the scope of protection of the present disclosure.

The invention claimed is:

1. A method for improving a control efficiency of a two-dimensional (2D) airfoil rudder surface, comprising:
   step 1: determining a rudder surface efficiency of an original symmetric airfoil rudder surface;
   step 2: replacing the original symmetric airfoil rudder surface with an asymmetric airfoil rudder surface of equal or greater rudder surface efficiency;
   step 3: translating the asymmetric airfoil rudder surface downward and in a leading edge direction of a main wing, allowing the same to be misaligned with the main wing to generate a misalignment gap, and determining a rudder surface efficiency at a current misalignment position;
   step 4: repeating step 3 to determine a misalignment position with an optimal rudder surface efficiency; and
   step 5: changing, in a case that a rudder surface control efficiency fails to meet control requirements, a position of a rudder surface relative to the main wing, allowing the rudder surface to be translated to the misalignment position with an optimal rudder surface efficiency.

2. The method according to claim 1, wherein step 1 comprises:
   selecting a rudder deflection angle, and acquiring, by a wind tunnel experiment and/or numerical simulation, a relationship of a pitching moment of the original symmetric airfoil rudder surface changing with an angle of attack at the rudder deflection angle; and
   repeating the above step to acquire relationships of pitching moments changing with angles of attack at a plurality of typical rudder deflection angles.

3. The method according to claim 2, wherein step 2 comprises: changing a shape of the original symmetric airfoil rudder surface to an asymmetric airfoil, and selecting the typical rudder deflection angles in step 1 for wind tunnel experiments and/or numerical simulations to obtain a desired asymmetric airfoil rudder surface.

4. The method according to claim 2, wherein step 3 comprises: selecting the typical rudder deflection angles in step 1 for wind tunnel experiments and/or numerical simulations to determine the rudder surface efficiency at the current misalignment position.

\* \* \* \* \*